United States Patent
Je et al.

(10) Patent No.: US 11,618,496 B2
(45) Date of Patent: Apr. 4, 2023

(54) MOTOR CONTROL APPARATUS AND METHOD OF ELECTRIC POWER STEERING SYSTEM

(71) Applicant: HYUNDAI MOBIS CO., LTD., Seoul (KR)

(72) Inventors: Sung Kyu Je, Yongin-si (KR); Kyu Ha Kim, Yongin-si (KR); Jeong Hoon Seo, Yongin-si (KR); A Long Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 235 days.

(21) Appl. No.: 17/137,109

(22) Filed: Dec. 29, 2020

(65) Prior Publication Data
US 2022/0169302 A1 Jun. 2, 2022

(30) Foreign Application Priority Data
Dec. 1, 2020 (KR) .................. 10-2020-0165504

(51) Int. Cl.
*B62D 5/04* (2006.01)

(52) U.S. Cl.
CPC ........... *B62D 5/046* (2013.01); *B62D 5/0496* (2013.01)

(58) Field of Classification Search
CPC .................................................. B62D 5/0496
See application file for complete search history.

(56) References Cited

U.S. PATENT DOCUMENTS

| 4,789,040 | A | * | 12/1988 | Morishita | B62D 5/0496 388/930 |
| 7,222,694 | B2 | * | 5/2007 | Toda | B62D 5/0496 180/444 |
| 8,251,172 | B2 | * | 8/2012 | Inoue | B62D 5/0463 318/434 |
| 8,874,315 | B2 | * | 10/2014 | Kariatsumari | B62D 5/046 180/443 |
| 9,278,708 | B2 | * | 3/2016 | Kouichi | B62D 5/0421 |
| 11,124,225 | B2 | * | 9/2021 | Jeong | B60R 16/0231 |

(Continued)

FOREIGN PATENT DOCUMENTS

| JP | 2010173376 A | * | 8/2010 |
| KR | 10-2001-0096718 A | | 11/2001 |
| KR | 2011-0085376 | | 7/2011 |

OTHER PUBLICATIONS

Korean Office Action dated Jun. 22, 2022 issued in KR 10-2020-0165504.

(Continued)

*Primary Examiner* — Amy R Weisberg
*Assistant Examiner* — Hosam Shabara
(74) *Attorney, Agent, or Firm* — DLA Piper LLP (US)

(57) ABSTRACT

Disclosed are a motor control apparatus and method in an electric power steering (EPS) system for a vehicle. The motor control apparatus of an EPS system for a vehicle includes a temperature sensing unit configured to sense a temperature of a motor controller for controlling the motor in the EPS system and an output control module configured to adjust a motor current, applied from a steering control module of the EPS system to the motor, based on the motor current and the temperature of the motor controller sensed by the temperature sensing unit.

20 Claims, 7 Drawing Sheets

(56) References Cited

U.S. PATENT DOCUMENTS

2008/0154462 A1* 6/2008 Yamamoto ........... B62D 5/0469
  701/41
2011/0178681 A1* 7/2011 Gu ....................... B62D 5/0496
  701/42

OTHER PUBLICATIONS

English Language Abstract of KR 2011-0085376 published Jul. 27, 2011.

* cited by examiner

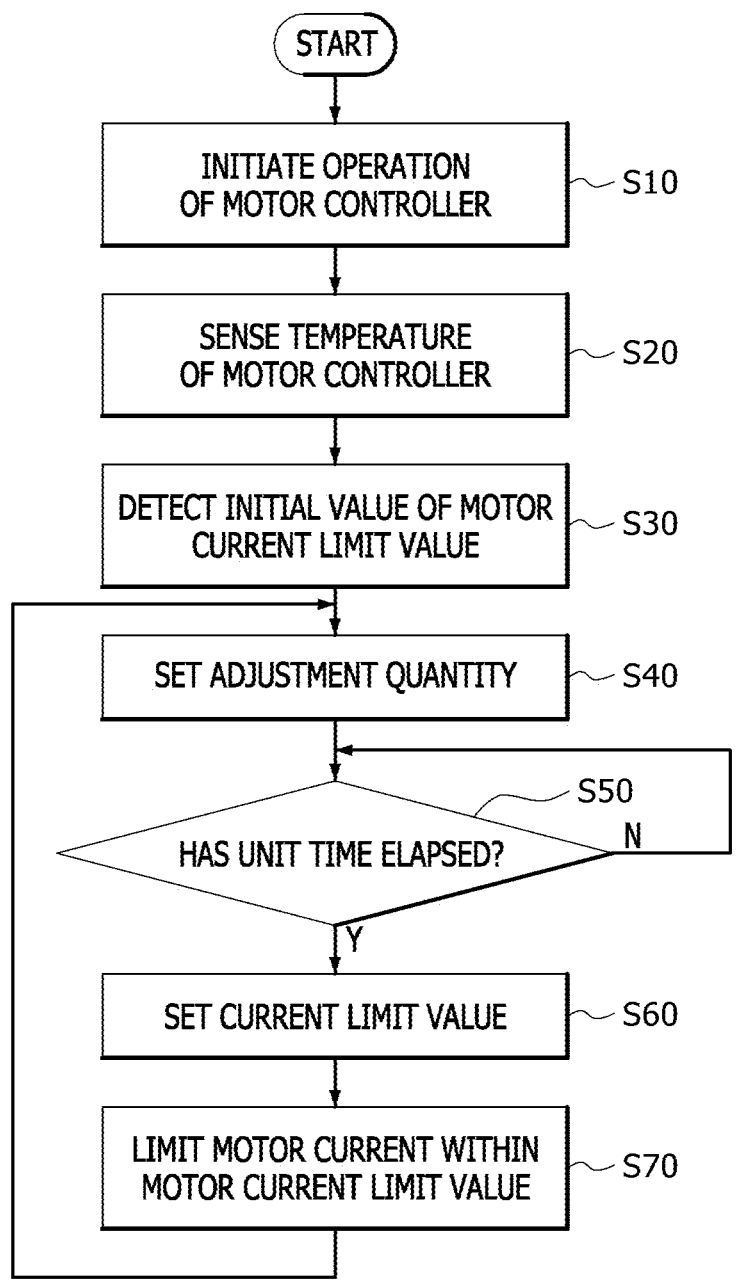

MOTOR CONTROL APPARATUS AND METHOD OF ELECTRIC POWER STEERING SYSTEM

CROSS-REFERENCE TO RELATED APPLICATION

This application claims priority from and the benefit of Korean Patent Application No. 10-2020-0165504, filed on Dec. 1, 2020, which is hereby incorporated by reference for all purposes as if set forth herein.

BACKGROUND

Field

Exemplary embodiments of the present disclosure relate to a motor control apparatus and method of an electric power steering (EPS) system for a vehicle, and more particularly, to a motor control apparatus and method of an EPS system for a vehicle, which can adjust output of the motor based on a motor current for controlling the motor and a temperature of a motor controller.

Discussion of the Background

An electric power steering (EPS) system for a vehicle is a steering apparatus that assists the steering power of a steering wheel by an electric motor. The EPS system controls torque of the motor for assisting the steering power of the steering wheel through a motor current using input, such as a vehicle speed, column torque, absolute torque, an absolute steering angle, or a state of a vehicle.

In general, the EPS system measures a motor current input to the motor, decreases auxiliary steering torque of the EPS system by decreasing the motor current when a vehicle speed is high, and increases the auxiliary steering torque by increasing the motor current when the vehicle speed is low.

The motor of the EPS system practically plays a role as an actuator. The motor of the EPS system is divided into a BLAC type and a DC type. In particular, the DC type motor (hereinafter simply referred to as the "DC motor") has excellent price competitiveness, and an application thereof is expanded along with the development of a control technology.

However, the DC motor adopts protection logic for limiting output of the motor in order to protect the DC motor against heat because overheating may occur due to the DC motor rotated with a brush always brought into contact with the DC motor.

The background technology of the present disclosure is disclosed in Korean Patent Application Publication No. 2001-0096718 (Nov. 8, 2001) entitled "CONTROL CIRCUIT FOR DC MOTOR OF ELECTRIC POWER STEERING"

SUMMARY

Conventionally, a temperature of a motor is predicted using a temperature, current, resistance, reactance, etc. of a motor controller. Output of the motor is limited based on the predicted temperature of the motor.

However, if a temperature of the motor is predicted based on a temperature, current, resistance, reactance, etc. of the motor controller, there is a problem in that prediction accuracy is low in the case of a DC motor having a relatively great thermal capacity. As a result, there is a problem in that a determination of whether the DC motor is overheated is inaccurate.

Various embodiments are directed to providing a motor control apparatus and method in an EPS system for a vehicle, which can protect the motor of the EPS system by adjusting output of the motor based on a motor current for controlling the motor and a temperature of a motor controller.

In an embodiment, a motor control apparatus and method in an electric power steering (EPS) system for a vehicle includes a temperature sensing unit configured to sense a temperature of a motor controller for controlling the motor in the EPS system and an output control module configured to adjust a motor current, applied from a steering control module of the EPS system to the motor, based on the motor current and the temperature of the motor controller sensed by the temperature sensing unit.

In an embodiment, the output control module includes a limit value detection unit configured to detect a motor current limit value based on the temperature of the motor controller and the motor current, an adjustment quantity detection unit configured to detect an adjustment quantity for limiting a motor current based on the temperature of the motor controller and the motor current, and an output adjustment unit configured to limit the motor current by adjusting the motor current limit value based on the adjustment quantity detected by the adjustment quantity detection unit.

In an embodiment, the adjustment quantity detection unit increases or decreases the adjustment quantity based on the temperature of the motor controller.

In an embodiment, the adjustment quantity detection unit increases the size of the adjustment quantity as the temperature of the motor controller becomes high, and decreases the size of the adjustment quantity as the temperature of the motor controller becomes low.

In an embodiment, the adjustment quantity is divided into a plurality of regions based on the size of the adjustment quantity.

In an embodiment, the regions include a first decrease region in which the motor current limit value is relatively greatly decreased because the motor current limit value is greater than the motor current, a second decrease region in which after the motor current limit value and the motor current are made identical with each other, the motor current limit value is relatively small decreased compared to the first decrease region, a maintenance region in which the motor current limit value is maintained, and an increase region in which the motor current limit value is increased.

In an embodiment, the limit value detection unit sets an initial value of the motor current limit value to be relatively greater than the motor current.

In an embodiment, the limit value detection unit sets the initial value of the motor current limit value based on operation duration for which the motor is operable at a rated current.

In an embodiment, the output adjustment unit adjusts the motor current limit value whenever a preset setting time elapses.

In an embodiment, the temperature of the motor controller is an initial temperature of the motor controller first sensed after an operation of the EPS system is initiated.

In an embodiment, a motor control method of an electric power steering (EPS) system for a vehicle includes sensing a temperature of a motor controller of the EPS system and adjusting a motor current, applied from a steering control module of the EPS system to the motor, based on the motor current and the temperature of the motor controller sensed by a temperature sensing unit.

In an embodiment, the adjusting of the motor current includes detecting a motor current limit value based on the temperature of the motor controller and the motor current, detecting an adjustment quantity for limiting a motor current based on the temperature of the motor controller and the motor current, and limiting the motor current by adjusting the motor current limit value based on the adjustment quantity.

In an embodiment, the detecting of the adjustment quantity includes increasing or decreasing the adjustment quantity based on the temperature of the motor controller.

In an embodiment, the detecting of the adjustment quantity includes increasing the size of the adjustment quantity as the temperature of the motor controller becomes high and decreasing the size of the adjustment quantity as the temperature of the motor controller becomes low.

In an embodiment, the adjustment quantity is divided into a plurality of regions based on the size of the adjustment quantity.

In an embodiment, the regions include a first decrease region in which the motor current limit value is relatively greatly decreased because the motor current limit value is greater than the motor current, a second decrease region in which after the motor current limit value and the motor current are made identical with each other, the motor current limit value is relatively small decreased compared to the first decrease region, a maintenance region in which the motor current limit value is maintained, and an increase region in which the motor current limit value is increased.

In an embodiment, the detecting of the motor current limit value includes setting an initial value of the motor current limit value to be relatively greater than the motor current.

In an embodiment, the detecting of the motor current limit value includes setting the initial value of the motor current limit value based on operation duration for which the motor is operable at a rated current.

In an embodiment, the detecting of the motor current limit value includes adjusting the motor current limit value whenever a preset setting time elapses.

In an embodiment, the temperature of the motor controller is an initial temperature of the motor controller first sensed after an operation of the EPS system is initiated.

The motor control apparatus and method of an EPS system for a vehicle according to an aspect of the present disclosure can protect the motor of the EPS system by adjusting output of the motor based on a motor current for controlling the motor and a temperature of the motor controller.

The motor control apparatus and method of an EPS system for a vehicle according to another aspect of the present disclosure can limit output of the motor with low logic complexity relatively easily compared to the existing temperature prediction model for the motor.

BRIEF DESCRIPTION OF THE DRAWINGS

FIG. 7 is a flowchart of a motor control method of the EPS system according to an embodiment of the present disclosure.

DETAILED DESCRIPTION OF THE ILLUSTRATED EMBODIMENTS

Figure 1:
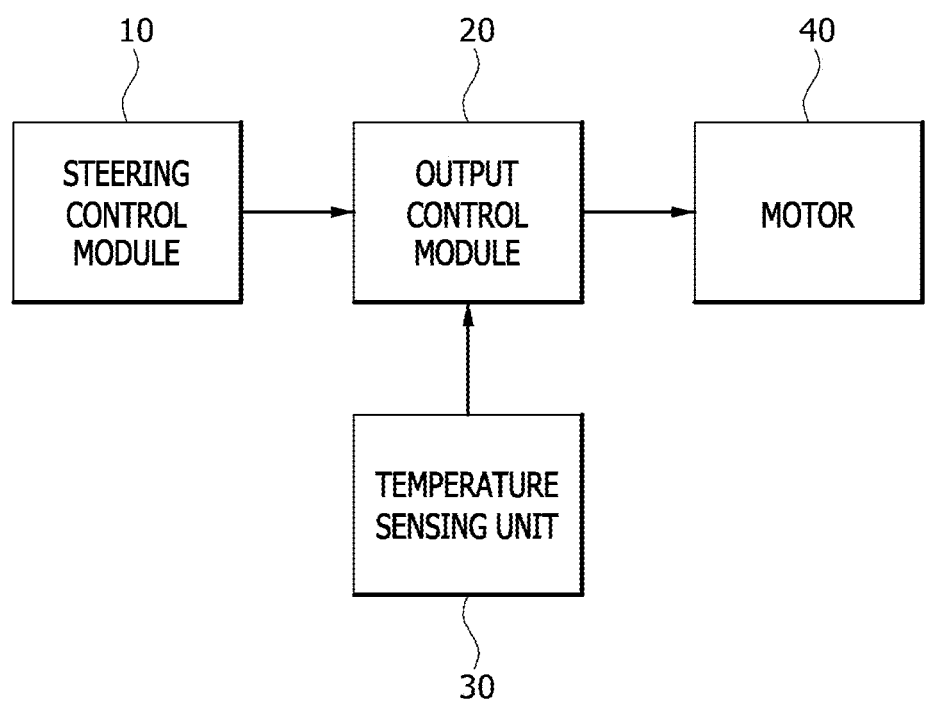
FIG. 1 is a block diagram of a motor control apparatus and method in an electric power steering (EPS) system for a vehicle according to an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, a motor control apparatus and method of an electric power steering (EPS) system will be described below with reference to the accompanying drawings through various exemplary embodiments. The thicknesses of lines or the sizes of elements in the drawings may have been exaggerated for the clarity of a description and for convenience' sake. Furthermore, terms to be described below have been defined by taking into consideration their functions in the present disclosure, and may be different depending on a user or operator's intention or practice. Accordingly, such terms should be defined based on the overall contents of this specification.

Figure 2:
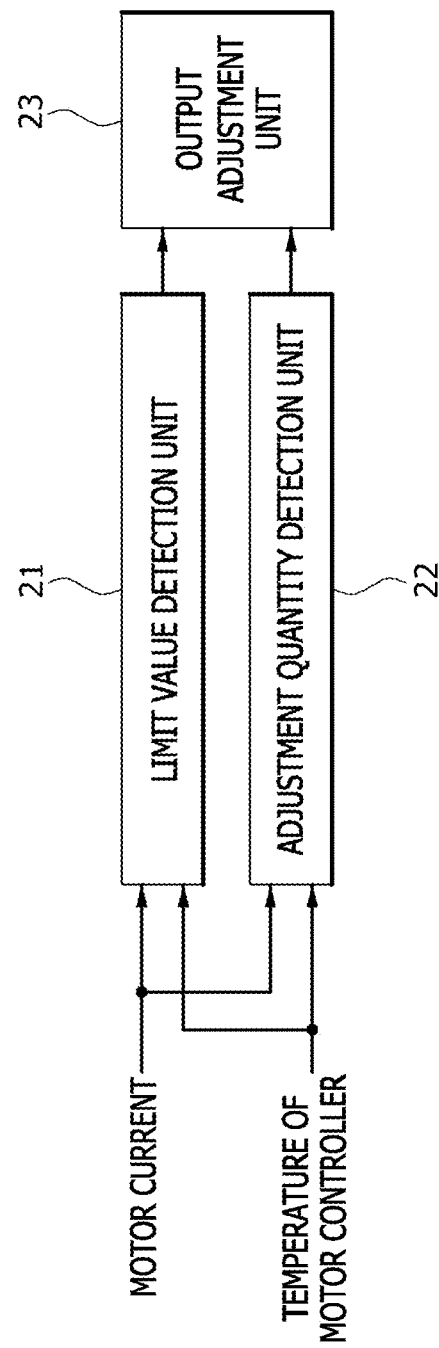
FIG. 2 is a block diagram of an output control module according to an embodiment of the present disclosure.
Figure 3:
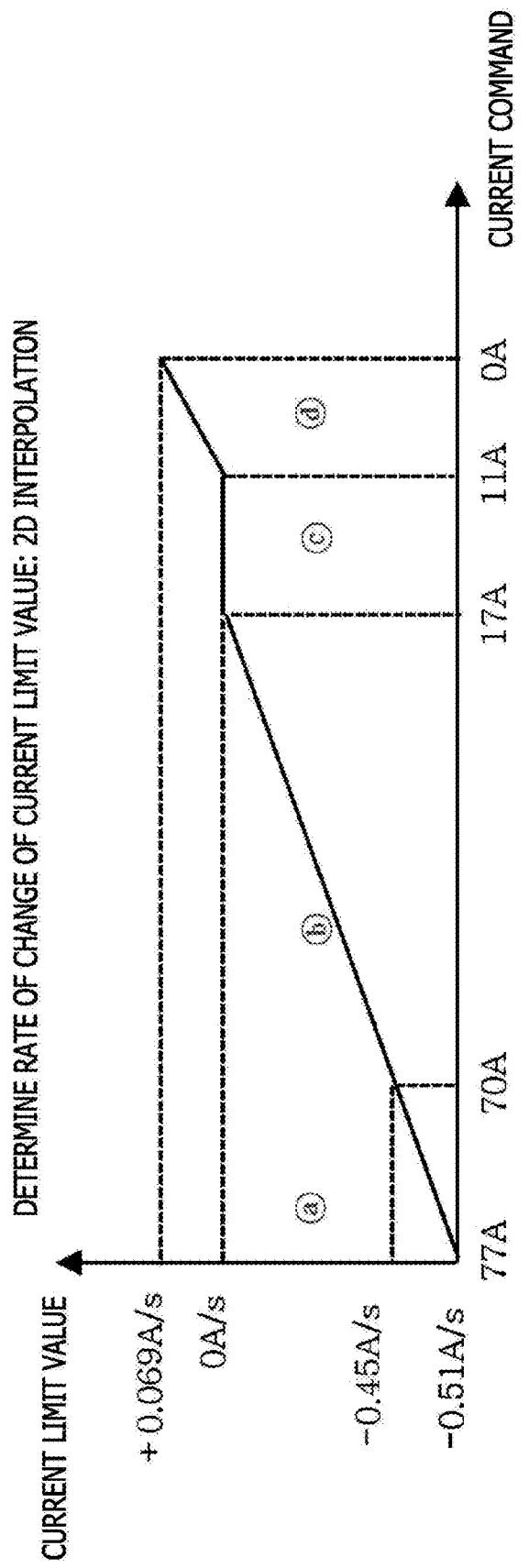
FIG. 3 is a diagram illustrating a rate of change depending on a command current and a temperature of a motor controller according to an embodiment of the present disclosure.
Figure 4:
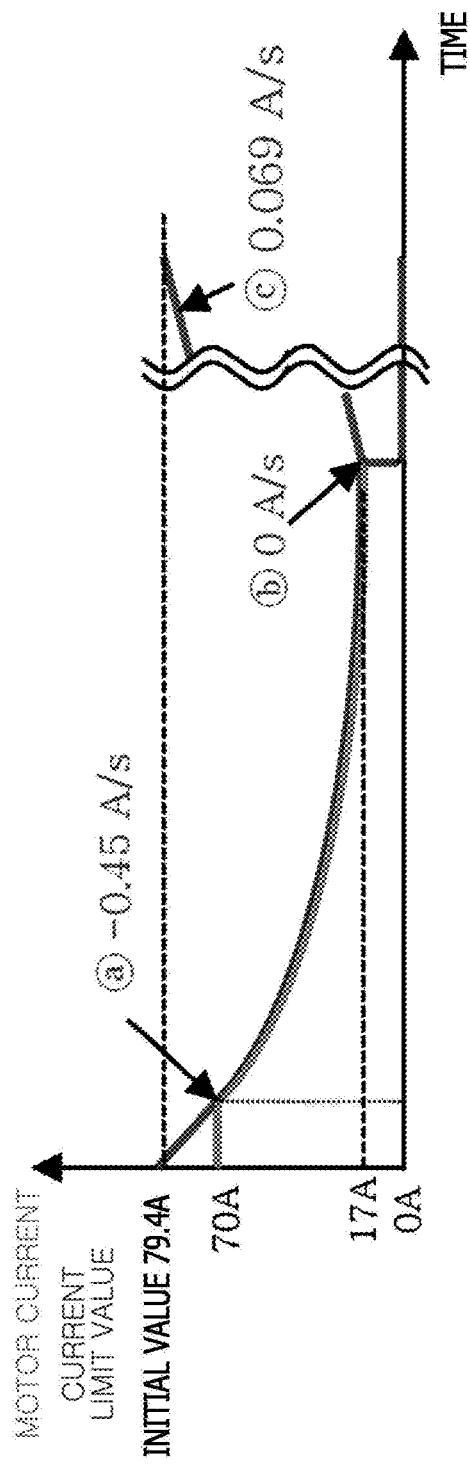
FIG. 4 is a diagram illustrating an example in which output of the motor is limited based on a motor current limit value according to an embodiment of the present disclosure.
Figure 5:
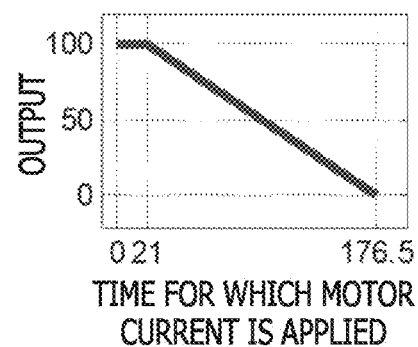
FIG. 5 is a diagram illustrating an initial limit value depending on a motor characteristic and a corresponding slope according to an embodiment of the present disclosure.
Figure 6:
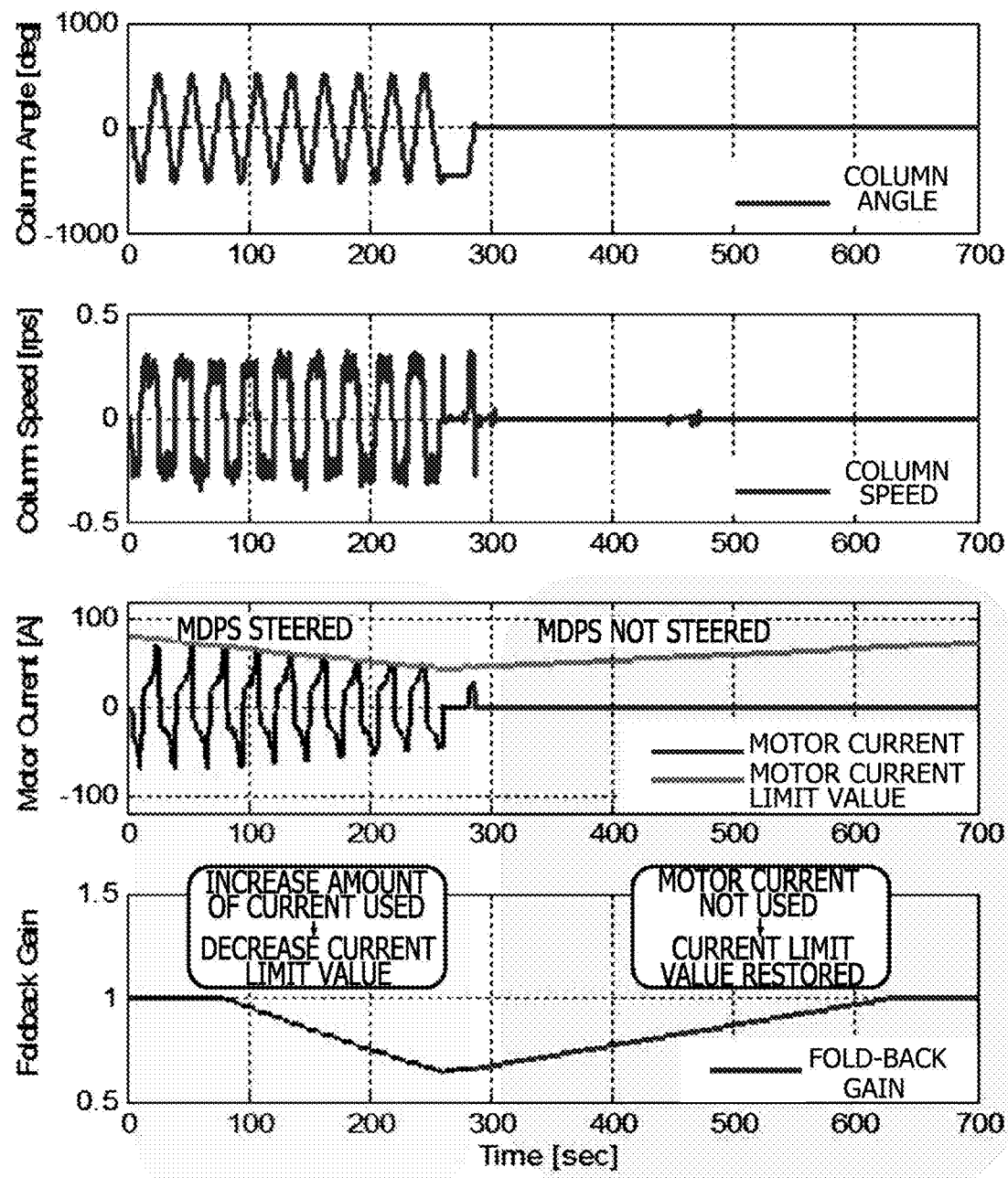
FIG. 6 is a diagram illustrating a change in the motor current limit value depending on a command current and a temperature of the motor controller according to an embodiment of the present disclosure.

FIG. 1 is a block diagram of a motor control apparatus and method in an EPS system for a vehicle according to an embodiment of the present disclosure. FIG. 2 is a block diagram of an output control module according to an embodiment of the present disclosure. FIG. 3 is a diagram illustrating a rate of change depending on a command current and a temperature of a motor controller according to an embodiment of the present disclosure. FIG. 4 is a diagram illustrating an example in which output of the motor is limited based on a motor current limit value according to an embodiment of the present disclosure. FIG. 5 is a diagram illustrating an initial limit value depending on a motor characteristic and a corresponding slope according to an embodiment of the present disclosure. FIG. 6 is a diagram illustrating a change in the motor current limit value depending on a command current and a temperature of the motor controller according to an embodiment of the present disclosure.

Referring to FIG. 1, the motor control apparatus of an EPS system for a vehicle according to an embodiment of the present disclosure includes a steering control module 10, an output control module 20, a temperature sensing unit 30, and a motor 40.

The steering control module 10 assists the steering power of a steering wheel by controlling the motor 40 of the EPS system. The EPS system may be electric power steering (EPS). However, the present disclosure is not limited to EPS, and a motor-driven power steering (MDPS) may also be adopted.

The steering control module 10 receives a vehicle speed, column torque, a steering angle, driving information, etc, generates a motor current based on the vehicle speed, column torque, steering angle, driving information, etc, and generates auxiliary steering torque by inputting the motor current to the motor 40.

The steering control module 10 decreases the auxiliary steering torque by decreasing the motor current when a vehicle speed is relatively high, and increases the auxiliary steering torque by increasing the motor current when the vehicle speed is relatively low.

The motor 40 is installed in a steering shaft, and generates auxiliary steering torque based on a motor current received from the steering control module 10. In the present embodiment, the motor 40 may be a DC motor, but the present disclosure is not limited to the embodiment.

The temperature sensing unit 30 senses a temperature of a motor controller (not illustrated) for controlling the motor 40 in the EPS system. The motor controller generates a motor current in response to a control signal received from the steering control module 10, and inputs the motor current to the motor 40.

The motor controller may be provided separately from the controller of the steering control module 10, but may be integrated with the controller of the steering control module 10 in a module form. If the motor controller is provided separately from the controller of the steering control module 10, the temperature sensing unit 30 may directly sense a temperature of the motor controller. If the motor controller is mounted within the controller of the steering control module 10, a temperature of the controller of the steering control module 10 may be substituted with a temperature of the motor controller.

The output control module 20 adjusts a motor current based on a motor current applied from the steering control module 10 of the EPS system to the motor 40 and a temperature of the motor controller sensed by the temperature sensing unit 30.

That is, if a driver performs a steering wheel manipulation, such as rotating a steering wheel up to both ends thereof, the output control module 20 decreases heat, which occurs when the motor 40 is driven, by adjusting a motor current limit value based on a temperature of the motor controller and a motor current and limiting a motor current based on the motor current limit value. Accordingly, the motor 40 is prevented from being damaged by heat which may occur by the driving of the motor 40 or the motor 40 is prevented from operating abnormally.

Referring to FIG. 2, the output control module 20 includes a limit value detection unit 21, an adjustment quantity detection unit 22, and an output adjustment unit 23.

The limit value detection unit 21 detects a motor current limit value based on a temperature of the motor controller and a motor current.

The motor current limit value is a current quantity set to limit a motor current. Accordingly, as the motor current limit value is increased or decreased based on an adjustment quantity, the motor current may also be adjusted within the motor current limit value. The adjustment quantity is described later.

A temperature of the motor controller is a temperature of the motor controller first sensed after an operation of the EPS system is initiated by vehicle turn-on.

A temperature of the motor controller may be different for each piece of vehicle turn-on timing. The temperature of the motor controller may be influenced by a time interval between vehicle turn-off timing and turn-on timing. When a vehicle is turned on after a lapse of a relatively long time from vehicle turn-off, a temperature of the motor controller may be relatively low. If a vehicle is turned shortly after some time from previous vehicle turn-off, a temperature of the motor controller may be relatively high.

In detecting a motor current limit value, the limit value detection unit 21 sets an initial value of the motor current limit value to be relatively greater than a motor current.

The initial value of the motor current limit value is a maximum value of motor current limit values, and is set based on operation duration for which the motor 40 may operate at a rated current. The initial value of the motor current limit value needs to be relatively higher than a value of the rated current because the motor 40 needs to be operable at the rated current for a given time. That is, the motor current limit value has the initial value as its maximum value, and is subsequently decreased based on an adjustment quantity, thus limiting a motor current.

The adjustment quantity detection unit 22 detects an adjustment quantity for limiting a motor current based on a temperature of the motor controller and a motor current.

The adjustment quantity detection unit 22 sets an adjustment quantity based on a temperature of the motor controller, that is, a temperature of the motor controller first sensed after an operation of the EPS system is initiated.

When the initial value of the motor current limit value is determined as described above, the adjustment quantity is applied for each piece of preset setting time. As a result, the motor current limit value is adjusted. Such an adjustment quantity may be increased or decreased based on a temperature of the motor controller and a motor current. For example, the size of the adjustment quantity may be increased as a temperature of the motor controller becomes high, and may be decreased as a temperature of the motor controller becomes low.

As illustrated in FIG. 3, the adjustment quantity may be divided into a plurality of regions, for example, four regions depending on its size.

The adjustment quantity may be divided into a first decrease region, a second decrease region, a maintenance region, and an increase region.

The first decrease region ⓐ is a region in which a motor current limit value is relatively greatly decreased because the motor current limit value is higher than a motor current and the size of an adjustment quantity is relatively the greatest. The first decrease region ⓐ is a region in which a relatively great current limit is necessary because a motor current is relatively very high. Referring to FIG. 3, the first decrease region ⓐ is a region in which a motor current is 77 A or less to less than 70 A and an adjustment quantity is −0.51 A/s. That is, when the motor current is 77 A or less to less than 70 A, the adjustment quantity of −0.51 A/s is applied to a motor current limit value for each setting time, for example, 1 second, so that the motor current limit value is decreased at intervals of −0.51 A/s.

The second decrease region ⓑ is a region in which after the motor current limit value and the motor current are made identical with each other, the motor current limit value is relatively small decreased compared to the first decrease region and the adjustment quantity is relatively small compared to the first decrease region. Referring to FIG. 3, the second decrease region ⓑ is a region which a motor current is 70 A or less to less than 17 A and an adjustment quantity is −0.45 A/s. That is, when the motor current is decreased and becomes 70 A or less to less than 17 A, the adjustment quantity of −0.45 A/s is applied to a motor current limit value for each setting time, so that the motor current limit value is decreased at intervals of −0.45 A/s. At this time, the motor current is limited within the motor current limit value. Accordingly, although the motor current is relatively greater than the motor current limit value, the motor current is limited within the motor current limit value.

The maintenance region ⓒ is a region in which a motor current limit value is maintained, and an adjustment quantity may be 0 because a change in the temperature of the motor 40 is very small although a current is used. Referring to FIG. 3, the maintenance region ⓒ is a region in which a motor current is 17 A or less to less than 11 A and an adjustment quantity is 0. That is, when a motor current limit value is decreased and becomes 17 A or less to less than 11 A, the motor current limit value continues to be maintained. The motor current in the maintenance region ⓒ is relatively smaller than the motor current limit value.

The increase region ⓓ is a region in which a motor current limit value is increased, and the size of an adjustment quantity needs to be recovered because a temperature of the motor 40 can maintain room temperature although a motor current is used. Referring to FIG. 3, the increase region ⓓ is a region in which a motor current is 11 A or less to 0 A or less and an adjustment quantity is +0.069 A/s. In the increase region ⓓ, a motor current limit value is increased at intervals of 0.069 A/s for each setting time, so that an adjustment quantity is recovered. A motor current in the increase region ⓓ is relatively smaller than a motor current limit value.

An initial value of a motor current limit value and an adjustment quantity may be variously set based on a temperature of the motor controller and a motor current.

In particular, the size of the adjustment quantity may be increased as a temperature of the motor controller becomes high and decreased as a temperature of the motor controller becomes low, an example of which is shown in Table 1 below.

TABLE 1

| Motor current | temperature | | |
| --- | --- | --- | --- |
| | 40 degrees | 60 degrees | 85 degrees |
| 77 A | −0.51 A/s | −2.858 A/s | −3.573 A/s |
| 70 A | −0.45 A/s | −2.568 A/s | −3.21 A/s |
| 17 A | 0 A/s | 0 A/s | 0 A/s |
| 11 A | 0 A/s | 0 A/s | 0 A/s |
| 0 A | +0.069 A/s | +0.069 A/s | +0.069 A/s |

From Table 1, it may be seen that the adjustment quantity is relatively great as the temperature of the motor controller becomes high.

The output adjustment unit 23 adjusts a motor current limit value based on an adjustment quantity detected by the adjustment quantity detection unit 22.

That is, when an adjustment quantity is detected by the adjustment quantity detection unit 22, the output adjustment unit 23 adjusts a motor current limit value in stages whenever a setting time elapses, and limits a motor current within the adjusted motor current limit value.

Referring to FIG. 4, when an initial value of a motor current limit value is 79.4 A and a motor current is 70 A, the output adjustment unit 23 decreases the motor current limit value at intervals of an adjustment quantity of −0.51 A/s for each setting time of 1 second (ⓐ). Although the motor current limit value is decreased, the motor current is relatively smaller than the motor current limit value. Accordingly, the motor current 70 A by the steering control module 10 is output without any change.

When the motor current limit value is decreased and the motor current becomes 70 A or less to less than 17 A, the output adjustment unit 23 decreases the motor current limit value at intervals of an adjustment quantity of −0.45 A/s whenever a setting time elapsed, and limits the motor current within the decreased motor current limit value (ⓑ).

When the motor current limit value is decreased and the motor current becomes 17 A or less to less than 11 A, the output adjustment unit 23 continues to maintain the motor current limit value because the adjustment quantity is 0 A/s (ⓒ). At this time, a motor current is within the range of the motor current limit value.

When the motor current limit value is decreased and the motor current becomes 11 A or less to 0 A or less, the output adjustment unit 23 increases the motor current limit value at intervals of an adjustment quantity of +0.069 A/s whenever a setting time elapses. Accordingly, the motor current limit value is recovered. At this time, a motor current is within the range of the motor current limit value.

In the present embodiment, an initial value of a motor current limit value is a maximum value of motor current limit values, and needs to be relatively higher than a value of a rated current because the motor 40 needs to generate the rated current for a given time.

Referring to FIG. 5, in the case of the motor 40 capable of continuously inputting a rated current of 70 A for 21 seconds, an initial value of a motor current limit value and an adjustment quantity may be set so that a motor current can be limited to 70 A or less within the 21 seconds. For example, when the initial value of the motor current limit value is 79.4 A and the adjustment quantity is −0.51 A/s, the motor current limit value may be adjusted within 70 A within the 21 seconds.

From FIG. 6, it may be seen that if a driver steers a steering wheel up to both ends, a motor current is limited within a motor current limit value by limiting the motor current limit value as described above.

A motor control method of an EPS system according to an embodiment of the present disclosure is described in detail below with reference to FIG. 7.

FIG. 7 is a flowchart of a motor control method of the EPS system according to an embodiment of the present disclosure.

Referring to FIG. 7, when the steering control module 10 operates and an operation of the motor controller is initiated (S10), the temperature sensing unit 30 senses a temperature of the motor controller (S20).

When the temperature of the motor controller is sensed, the limit value detection unit 21 detects a motor current limit value based on a motor current and the temperature of the motor controller received from the steering control module 10 (S30).

Furthermore, the adjustment quantity detection unit 22 detects an adjustment quantity for limiting the motor current based on the temperature of the motor controller and the motor current (S40).

When the motor current limit value is detected by the limit value detection unit 21 and the adjustment quantity is detected by the adjustment quantity detection unit 22, the output adjustment unit 23 adjusts the motor current limit value in stages whenever a setting time elapses (S50 and S60), and limits the motor current within the adjusted motor current limit value (S70).

For example, when an initial value of a motor current limit value is 79.4 A and a motor current is 70 A, the output adjustment unit 23 decreases the motor current limit value at intervals of an adjustment quantity of −0.51 A/s for each setting time of 1 second, and limits the motor current within the decreased motor current limit value. In this case, although the motor current limit value is decreased, the motor current of 70 A is output without any change because the motor current is relatively smaller than the motor current limit value.

Thereafter, when the motor current limit value is decreased and the motor current becomes 70 A or less to less than 17 A, the output adjustment unit 23 decreases the motor current limit value at intervals of an adjustment quantity of −0.45 A/s whenever a setting time elapses, and limits the motor current within the decreased motor current limit value.

Furthermore, when the motor current limit value is decreased and the motor current becomes 17 A or less to less than 11 A, the output adjustment unit 23 continues to maintain the motor current limit value because an adjustment quantity is 0 A/s. Thereafter, when the motor current becomes 11 A or less to 0 A or less, the output adjustment unit 23 increases the motor current limit value at intervals of an adjustment quantity +0.069 A/s whenever a setting time elapses, so that the motor current is also gradually restored.

As described above, the motor control apparatus and method of an EPS system for a vehicle according to an embodiment of the present disclosure protect the motor against overheating by adjusting output of the motor based on a motor current for controlling the motor in the EPS system and a temperature of the motor controller.

Furthermore, the motor control apparatus and method of an EPS system for a vehicle according to an embodiment of the present disclosure can limit output of the motor with low logic complexity relatively easily compared to the existing temperature prediction model for the motor.

An implementation described in this specification may be realized as a method or process, apparatus, software program, data stream or signal, for example. Although the present disclosure has been discussed only in the context of a single form of an implementation (e.g., discussed as only a method), an implementation having a discussed characteristic may also be realized in another form (e.g., apparatus or program). The apparatus may be implemented as proper hardware, software or firmware. The method may be implemented in an apparatus, such as a processor commonly referring to a processing device, including a computer, a microprocessor, an integrated circuit or a programmable logic device, for example. The processor includes a communication device, such as a computer, a cell phone, a mobile phone/personal digital assistant ("PDA") and another device which facilitates the communication of information between end-users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A motor control apparatus of an electric power steering (EPS) system for a vehicle, the apparatus comprising:
    a temperature sensing unit configured to sense a temperature of a motor controller for controlling the motor in the EPS system; and
    an output control module configured to adjust a motor current, applied from a steering control module of the EPS system to the motor, based on the motor current and the temperature of the motor controller sensed by the temperature sensing unit, wherein the output control module comprises a limit value detection unit configured to detect a motor current limit value based on the temperature of the motor controller and the motor current.

2. The apparatus of claim 1, wherein the output control module further comprises:
    an adjustment quantity detection unit configured to detect an adjustment quantity for limiting the motor current based on the temperature of the motor controller and the motor current; and
    an output adjustment unit configured to limit the motor current by adjusting the motor current limit value based on the adjustment quantity detected by the adjustment quantity detection unit.

3. The apparatus of claim 2, wherein the adjustment quantity detection unit increases or decreases the adjustment quantity based on the temperature of the motor controller.

4. The apparatus of claim 3, wherein the adjustment quantity detection unit
    increases a size of the adjustment quantity as the temperature of the motor controller becomes high, and
    decreases the size of the adjustment quantity as the temperature of the motor controller becomes low.

5. The apparatus of claim 2, wherein the adjustment quantity is divided into a plurality of regions based on a size of the adjustment quantity.

6. The apparatus of claim 5, wherein the regions comprise:
    a first decrease region in which the motor current limit value is relatively greatly decreased because the motor current limit value is greater than the motor current,
    a second decrease region in which after the motor current limit value and the motor current are made identical with each other, the motor current limit value is relatively small decreased compared to the first decrease region,
    a maintenance region in which the motor current limit value is maintained, and
    an increase region in which the motor current limit value is increased.

7. The apparatus of claim 2, wherein the limit value detection unit sets an initial value of the motor current limit value to be relatively greater than the motor current.

8. The apparatus of claim 7, wherein the limit value detection unit sets the initial value of the motor current limit value based on operation duration for which the motor is operable at a rated current.

9. The apparatus of claim 2, wherein the output adjustment unit adjusts the motor current limit value whenever a preset setting time elapses.

10. The apparatus of claim 1, wherein the temperature of the motor controller is an initial temperature of the motor controller first sensed after an operation of the EPS system is initiated.

11. A motor control method of an electric power steering (EPS) system for a vehicle, the method comprising:
sensing a temperature of a motor controller of the EPS system; and
adjusting a motor current, applied from a steering control module of the EPS system to the motor, based on the motor current and the temperature of the motor controller sensed by a temperature sensing unit, wherein the adjusting of the motor current comprises detecting a motor current limit value based on the temperature of the motor controller and the motor current.

12. The method of claim 11, wherein the adjusting of the motor current further comprises:
detecting an adjustment quantity for limiting the motor current based on the temperature of the motor controller and the motor current; and
limiting the motor current by adjusting the motor current limit value based on the adjustment quantity.

13. The method of claim 12, wherein the detecting of the adjustment quantity comprises increasing or decreasing the adjustment quantity based on the temperature of the motor controller.

14. The method of claim 13, wherein the detecting of the adjustment quantity comprises:
increasing a size of the adjustment quantity as the temperature of the motor controller becomes high, and
decreasing the size of the adjustment quantity as the temperature of the motor controller becomes low.

15. The method of claim 12, wherein the adjustment quantity is divided into a plurality of regions based on a size of the adjustment quantity.

16. The method of claim 15, the regions comprise:
a first decrease region in which the motor current limit value is relatively greatly decreased because the motor current limit value is greater than the motor current,
a second decrease region in which after the motor current limit value and the motor current are made identical with each other, the motor current limit value is relatively small decreased compared to the first decrease region,
a maintenance region in which the motor current limit value is maintained, and
an increase region in which the motor current limit value is increased.

17. The method of claim 12, wherein the detecting of the motor current limit value comprises setting an initial value of the motor current limit value to be relatively greater than the motor current.

18. The method of claim 17, wherein the detecting of the motor current limit value comprises setting the initial value of the motor current limit value based on operation duration for which the motor is operable at a rated current.

19. The method of claim 12, wherein the detecting of the motor current limit value comprises adjusting the motor current limit value whenever a preset setting time elapses.

20. The method of claim 11, wherein the temperature of the motor controller is an initial temperature of the motor controller first sensed after an operation of the EPS system is initiated.

* * * * *